US010205551B2

(12) United States Patent
Cress et al.

(10) Patent No.: US 10,205,551 B2
(45) Date of Patent: Feb. 12, 2019

(54) SYSTEMS AND METHODS FOR POWER LEVELING IN PASSIVE OPTICAL NETWORKS

(71) Applicant: ADTRAN, Inc., Huntsville, AL (US)

(72) Inventors: Jared D. Cress, Decatur, AL (US); Nagaraj Padur, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 15/400,073

(22) Filed: Jan. 6, 2017

(65) Prior Publication Data
US 2018/0198552 A1 Jul. 12, 2018

(51) Int. Cl.
H04J 14/02 (2006.01)
H04B 10/079 (2013.01)

(52) U.S. Cl.
CPC .... H04J 14/0221 (2013.01); H04B 10/07955 (2013.01)

(58) Field of Classification Search
CPC ............ H04B 10/07955; H04J 14/0221
See application file for complete search history.

(56) References Cited

U.S. PATENT DOCUMENTS

| 4,868,795 | A | 9/1989 | McDavid et al. |
| 6,922,448 | B1 | 7/2005 | Jacobsen et al. |
| 2003/0099350 | A1 | 5/2003 | Bostoen et al. |
| 2009/0129773 | A1* | 5/2009 | Oron ............... H04B 10/0793 398/10 |
| 2010/0183316 | A1* | 7/2010 | Gordon ............ H04J 3/0682 398/149 |
| 2011/0142444 | A1* | 6/2011 | Borges ............. H04L 12/413 398/25 |
| 2011/0218693 | A1 | 9/2011 | Tsunoda et al. |

(Continued)

FOREIGN PATENT DOCUMENTS

JP 2014175754 A * 9/2014

OTHER PUBLICATIONS

ITU-T G.989.3, "Series G: Transmission Systems and Media, Digital Systems and Networks," International Telecommunication Union, pp. 118-164, sections 12-13, Oct. 2015.

Primary Examiner — Casey Kretzer
(74) Attorney, Agent, or Firm — Maynard Cooper & Gale, P.C.; Jon E. Holland

(57) ABSTRACT

Systems and methods are provided for an optical network unit (ONU) to automatically set its output power level for messages to be transmitted on a passive optical network. The ONU can autonomously determine the appropriate power level based on information provided to the ONU by an optical line terminal (OLT) and characterization by the ONU of optical signals it receives from the fiber. Specifically, the OLT can provide the ONU with control data indicative of the power level used by the OLT to transmit the message and the desired power level of the OLT for messages from the ONU. The ONU can measure the power level of at least one message received from the OLT and determine the path loss based on the measured power and the control data. The ONU can then automatically determine a suitable power level for its response message such that unacceptable levels of crosstalk between channels are avoided without having to perform an iterative power-leveling process that otherwise may introduce significant delays.

15 Claims, 5 Drawing Sheets

(56) References Cited

U.S. PATENT DOCUMENTS

| | | | |
|---|---|---|---|
| 2014/0161436 A1* | 6/2014 | Lee | H04B 10/03 398/1 |
| 2014/0248053 A1* | 9/2014 | Tamai | H04J 14/0256 398/66 |
| 2014/0288721 A1 | 9/2014 | Funakubo | |
| 2015/0055955 A1* | 2/2015 | Kim | H04J 14/0239 398/69 |
| 2015/0381300 A1* | 12/2015 | Roberts | H04B 10/07955 398/68 |

* cited by examiner

SYSTEMS AND METHODS FOR POWER LEVELING IN PASSIVE OPTICAL NETWORKS

BACKGROUND

The present application generally relates to systems and methods for determining transmission power levels for optical signals communicated by optical network units.

A Passive Optical Network (PON) communicates data between an Optical Line Terminal (OLT) and one more Optical Network Units (ONUs) connected via an optical distribution network (ODN). PONs utilize a point-to-multipoint physical layer architecture, where a power splitter is often used to connect a multiplicity of ONUs to the OLT. In an ideal scenario, the signal power arriving at the OLT from each ONU would be equal, as it typically is not desirable to favor the communications of one ONU over another in this manner. In practice, this equal receive power is rarely the case. The path loss between the OLT and each ONU varies depending on the physical interconnect the signal traverses, being impacted by distance and the arrangement of the splitters on the PON. This difference in loss along the various pathways is known as differential path loss.

In order to help compensate for the differential path loss such that all the signals arriving at the OLT will be more nearly equal, ONUs can adjust their signal launch power. An ONU with less loss to the OLT will launch less power, and an ONU with more loss to the OLT will launch more power. This technique is known as power leveling.

Power leveling is particularly important in newer generations of PON, such as an NGPON2 (next-generation passive optical network 2), which increase the capacity of the PON by operating multiple wavelengths simultaneously on the ODN via a mechanism known as time and wavelength division multiplexing (TWDM). In such a case, multiple ONUs may be transmitting at the same time but at different wavelengths or channels. In a perfect world, the signals at different wavelengths would be totally independent of one another. In practice, a signal in a given channel will have spectral tails, with some amount of energy bleeding into other channels. So long as this undesired energy bleeding over is small relative to the actual desired signal for that channel, communications will not be hindered. However, when differential path losses cause the desired signal arriving at the OLT to be very weak relative to the undesired tails from other channels, communications may be impaired.

FIG. 1 depicts an exemplary power spectrum for the received power at an OLT for three channels. Due to differential power loss, the received power for channels 1 and 3 may be much greater than the received power for channel 2 such that the tails of channels 1 and 3 bleed over into the band for channel 2 and are significant relative to the received power of channel 2. Power leveling may be performed whereby the transmit power of channels 1 and 3 are reduced so that there is less of a difference in the received power of channels 1-3, thereby reducing the interference in channel 2 caused by the tails of channels 1 and 3.

Typically, the power leveling process occurs during the ONU activation process, which occurs when an ONU joins the PON. In one instance, the OLT might measure the received signal level from an ONU and issue directives to the ONU to adjust its transmit level until the signal arrives at the OLT within a desired or optimum power range. However, prior to such power leveling process, it is possible for the power level of the signals from the ONU to exceed the optimum power range and cause unacceptable levels of crosstalk into neighboring channels. In order to avoid such interference, it is possible to configure the ONU to initially transmit at a low power level, well below the power levels that might cause unacceptable levels of crosstalk, and iteratively increase its transmission power until the OLT is able to hear the ONU and acknowledge its transmissions. However, such an iterative approach introduces delays into the activation process while the ONU is attempting to communicate at power levels too low to be successfully heard by the OLT.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present application generally pertains to systems and methods for optical network units (ONUs) of a passive optical network (PON) to automatically and quickly set their transmission power levels so as to avoid unacceptable levels of out-of-channel interference. By designing an optical line terminal (OLT) to advertise certain information, an ONU can then determine the appropriate power level to launch into the fiber, as will be described in more detail below.

In this regard, during an activation process for ONUs, the OLT creates a quiet window in the data traffic and then commands any unregistered ONU to respond during said window. This is the standard mechanism for discovering and registering ONUs with an OLT. However, in accordance with the present disclosure, the information advertised to the ONUs is extended to include the power level used by the OLT to transmit to the ONU 33, as well as the OLT's desired receive signal strength. The ONU measures the received power level of at least one downstream message and estimates the path loss between the OLT and the ONU by subtracting the received power level (as determined by the ONU) from the transmitted power level (as specified by the OLT). The ONU can then automatically determine the power level for its response message and/or other upstream messages to the OLT based on the path loss (as calculated by the ONU) and the desired receive signal strength of the OLT (as specified by the OLT). Thus, the ONU is able to quickly and deterministically set a suitable upstream transmission power level to be used for upstream messages, including those communicated in the activation process, without having to perform an iterative power-leveling algorithm. This shortens the overall time required for the PON to initialize, in some cases quite substantially.

Figure 2:
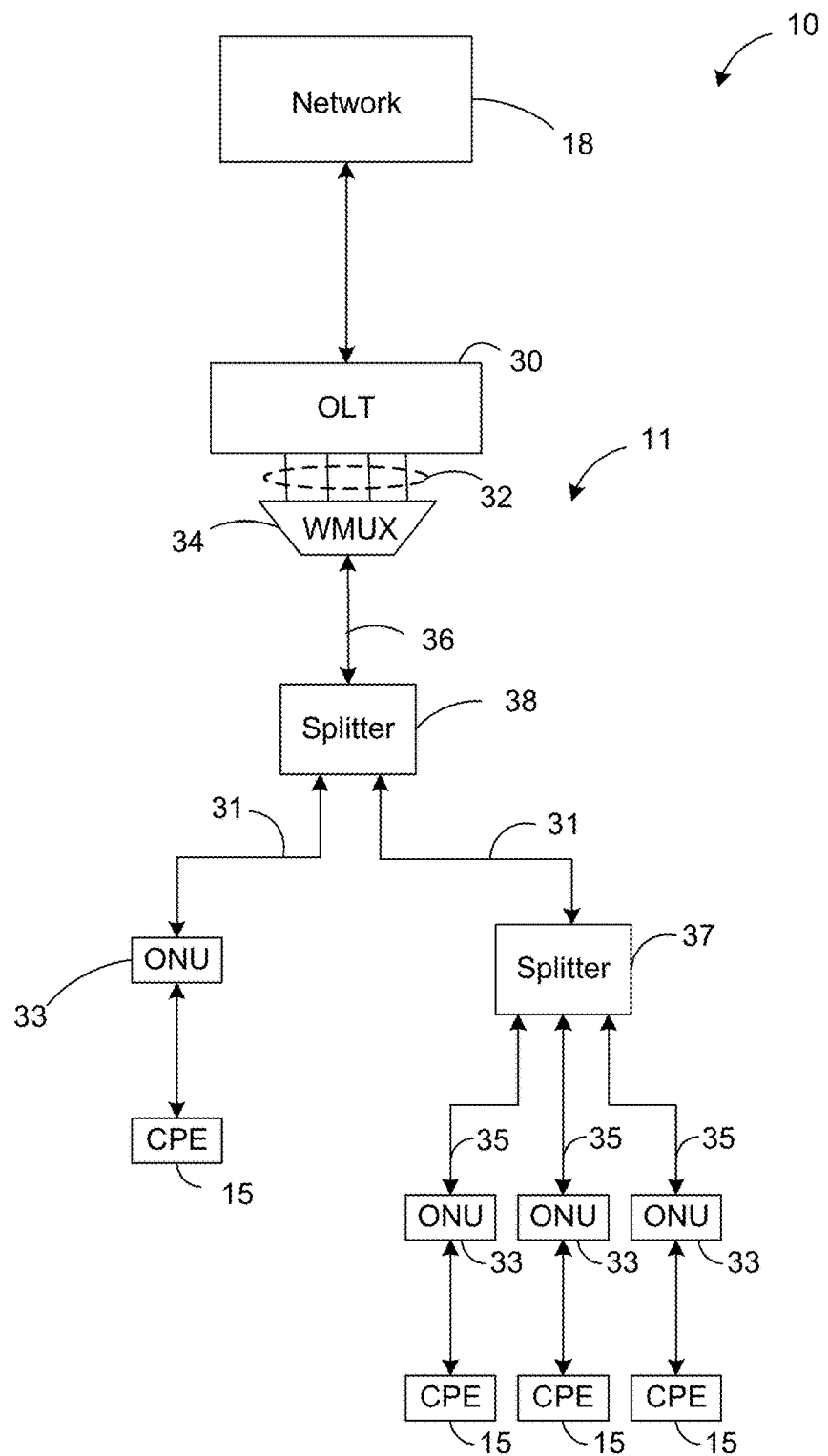
FIG. 2 is a block diagram illustrating an embodiment of a communication system for communicating between customer premises equipment (CPE) and a network.

FIG. 2 depicts an embodiment of communication system 10 that connects customer premises equipment (CPE) 15 at remote locations (e.g., customer premises) to a network 18. The system 10 has an optical distribution network (ODN) 11 for connecting an optical line terminal (OLT) 30 to one or more optical network units (ONUs) 33, which can be coupled to one or more CPEs 15. The OLT 30, ODN 11 and ONUs 33 implement a passive optical network (PON) through which data may be communicated both upstream and downstream.

In one embodiment, the ODN 11 can be terminated by NGPON2 (next-generation passive optical network 2) devices having one or more PON channels that are separated by wavelength. However, other types of optical network equipment may be used in other embodiments.

Each of the channels 32 of the PON has distinct upstream and downstream wavelengths used by the OLT 30 and the ONUs 33 to communicate. That is, each channel 32 has a downstream wavelength different than the downstream wavelengths of the other channels 32, and each channel 32 also has an upstream wavelength different than the upstream wavelengths of the other channels. As described above, if the received power level of a signal in one channel 32 is too high, isolation between channels may be inadequate to prevent the signal from bleeding or otherwise coupling into another channel 32 thereby causing crosstalk.

In the downstream direction, the channels 32 can be combined by a wavelength multiplexer (VVMUX) 34 for communication through a single fiber 36. In the upstream direction, the wavelength multiplexer 34 can separate the incoming channels from the fiber 36 using WDM and provide the separated signals to the OLT 30. In addition, for each of the channels 32 in the upstream direction, time division multiplexing (TDM) can be used to prevent interference among the ONUs 33. As shown in FIG. 2, the OLT 30 may have four (4) channels 32 that can be used for communication. However, it is to be understood that additional channels or fewer channels may be used in other embodiments.

In the embodiment shown by FIG. 2, the fiber 36 from the wavelength multiplexer 34 is coupled to an optical splitter 38 that divides each downstream signal for communication through optical fibers . One fiber 31 couples the splitter 38 directly to an ONU 33, and the other fiber 31 couples the splitter 38 to a second optical splitter 37. The second optical splitter 37 is configured to split each downstream signal from the splitter 38 across multiple optical fibers 35 that are respectively coupled to ONUs 33 as shown. Each ONU 33 can receive at least one packet flow from the OLT 30 and convert the received packet flow(s) from the optical domain to the electrical domain for communication with CPE 15. The ODN 11 shown in FIG. 2 may use additional or fewer optical splitters, fibers, ONUs, CPEs, and other components in other embodiments. In addition, the number of fibers connected to an optical splitter may be greater than or less than those shown in FIG. 2.

At least one ONU 33 is configured to perform a power-leveling process in an effort to ensure that the upstream signals communicated by it arrive at the OLT 30 within a desired or optimum power range that does not cause unacceptable levels of crosstalk into other channels (e.g., ensures that the crosstalk remains below a threshold level). In this regard, the OLT 30 is configured to transmit various messages having control data for controlling operations on the PON. At least one of these messages may be used by the ONUs 33 for determining an appropriate transmit power level so that upstream signals arrive at the OLT 30 within the desired or optimum power range. In one embodiment, such message includes a value, referred to hereafter as the "transmit power value," indicating the transmit power level of the OLT 30 and a value, referred to hereafter as the "receive power value," indicating the power level the OLT 30 deems desirable for reception.

After receiving the transmit power value and measuring the receive power of the signal from the OLT 30, the ONU 33 is configured to estimate the amount of path loss from the OLT 30 to the ONU 33 based on the measured power level and the transmit power value advertised to the ONU 33. As an example, the ONU 33 may subtract a value indicative of the measured power level from the transmit power value to provide an estimate of the path loss. Based on such estimate, the ONU 33 then calculates a transmit power level for an upstream signal such that the upstream signal should arrive at the OLT 30 at the desired receive level indicated by the receive power value. In many instances, the ONU 33 may assume that the upstream signal will incur the same or similar path loss in the upstream direction when determining the desired transmit power level for the upstream signal. For instance, for NGPON2, the C and L band losses for up and downstream transmission are approximately the same as to make the differences irrelevant. In scenarios where the wavelength-dependent losses of the fiber cause the upstream and downstream path losses to diverge (e.g. use of the O and L bands), signal propagation delay can be used to estimate the length of the fiber and a correction factor applied to the upstream transmit power level, In other embodiments, other techniques for estimating the path loss and calculating the desired upstream transmit power are possible.

It should be noted that the control message or messages used for advertising the OLT's transmit power and desired receive level may be of various signal types and may be transmitted from the OLT 30 to an ONU 33 at any time. In one embodiment, a control message is communicated to at least one ONU 33 during an activation process that occurs when the ONU 33 joins a PON implemented by the OLT 30. Such an activation process may be implemented by a handshaking sequence in which physical layer operations and maintenance (PLOAM) messages are communicated between the OLT 30 and ONU 33 for enabling the ONU 33 to communicate with the OLT 30 on the PON.

Figure 3:
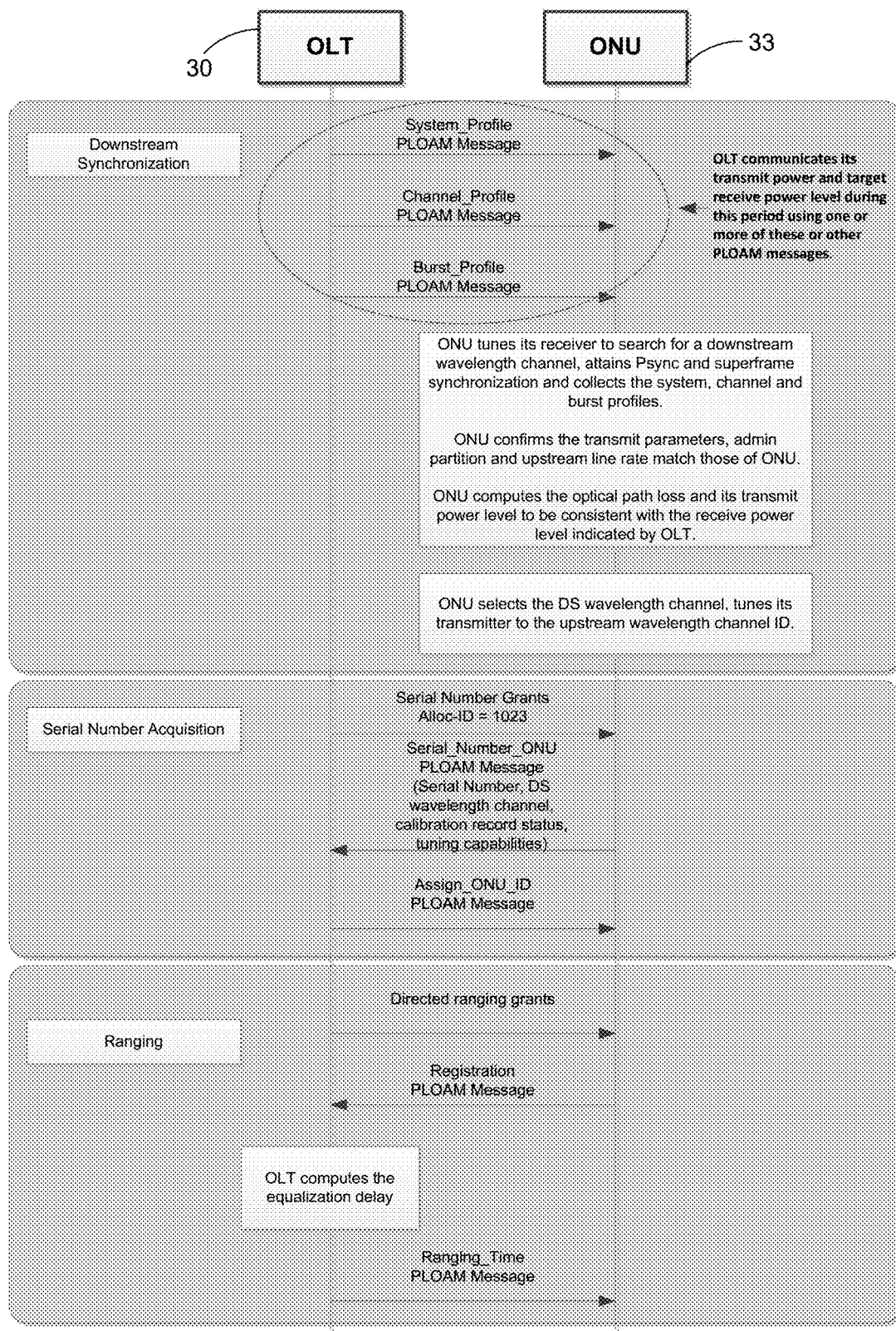
FIG. 3 illustrates a handshaking sequence for an activation process compatible with NGPON2.

During such an activation process, the OLT 30 may transmit downstream control messages, referred to hereafter as "advertisement messages," in which the OLT 30 advertises certain control information indicative of the OLT's communication capabilities and/or requirements to ONUs 33 that have yet to join the PON. For NGPON2, such advertisement messages are PLOAM messages that are transmitted in a downstream synchronization phase of the activation process. As an example, the OLT 30 transmits a system profile PLOAM message indicative of the PON's profile, a channel profile PLOAM message indicative of a profile for a channel of the PON, and a burst profile PLOAM message indicative of a burst profile for the PON, as shown by FIG. 3. Any of these PLOAM messages may be modified to advertise the transmit power value and/or the receive power value indicative of the OLT's transmit power level and desired receive power level, respectively. Also, the ONU 30 may measure the power level of any of these PLOAM messages for determining path loss as described above. In other embodiments, other profiles and types of messages may be used.

Any ONU 33 that receives the advertisement messages and has yet to join the PON implemented by the OLT 30 may respond to the advertisement messages by transmitting one or more messages for joining the PON and communicating with the OLT 30. As an example, the OLT 30 may define a quiet period after transmitting the advertisement messages so that any ONU 33 that has yet to join the PON may communicate with the OLT 30. During this quiet period, ONUs 33 that have previously joined the PON are not allowed to transmit upstream in order to prevent these ONUs 33 from interfering with messages communicated from ONUs 33 attempting to join the PON. In one embodiment, an ONU 33 that has yet to join the PON may transmit an upstream control message, referred to hereafter as an "advertisement reply," during such quiet period for informing the OLT 30 of the ONU's presence. Such advertisement reply may include the ONU's serial number or other identifier, which the OLT 30 uses to assign to the ONU 33 a network address for identifying the ONU 33 on the PON to be used for data communication with the ONU 33. Such network address is then communicated to the ONU 33 by the OLT 30 in another downstream PLOAM message and thereafter is used for communication between the OLT 30 and the ONU 33 on one of the PON channels.

In NGPON2, an ONU 33 transmits a PLOAM message that includes the ONU's serial number in a serial number acquisition phase that follows the downstream synchronization phase, as shown by FIG. 3. Such PLOAM message may also indicate other attributes about the ONU 33, such as the downstream wavelength channel heard by the ONU 33, calibration record status, and tuning capabilities. Following the serial number acquisition phase in NGPON2 is a ranging phase in which the OLT 30 and ONU 33 communicate PLOAM messages for controlling and optimizing communication between the OLT 30 and the ONU 33, such as determining an equalization delay to be used for the ONU 33, as shown by FIG. 3.

Notably, once the ONU 33 has calculated the desired transmit power level based on the advertisement messages, the ONU 33 thereafter may control its transmit power in accordance with the calculated transmit power level. As an example, in NGPON2, the PLOAM messages transmitted by the ONU 33 in the serial number acquisition phase and the ranging phase may be transmitted at the calculated transmit power level so that these messages should arrive at the OLT 30 within the desired receive power level indicated by the receive power value advertised to the ONUs 33 in the downstream synchronization phase. Thus, it can be ensured that the advertisement reply and other PLOAM messages transmitted by the ONU 33 in the activation process are transmitted at an appropriate power level so that the messages can be successfully heard by the OLT 33 without inducing unacceptable levels of crosstalk and without incurring delays that are typically associated with an iterative power-leveling process. An algorithm that determines the desired power level for transmissions from the ONU 33 without iteratively increasing the transmit power of the ONU 33 until the OLT 30 is able to hear messages from the ONU 33 shall be referred to herein as a "non-iterative" power-leveling algorithm. Note that the same transmit power level may be used by the ONU 33 for other types of messages as may be desired.

Figure 1:
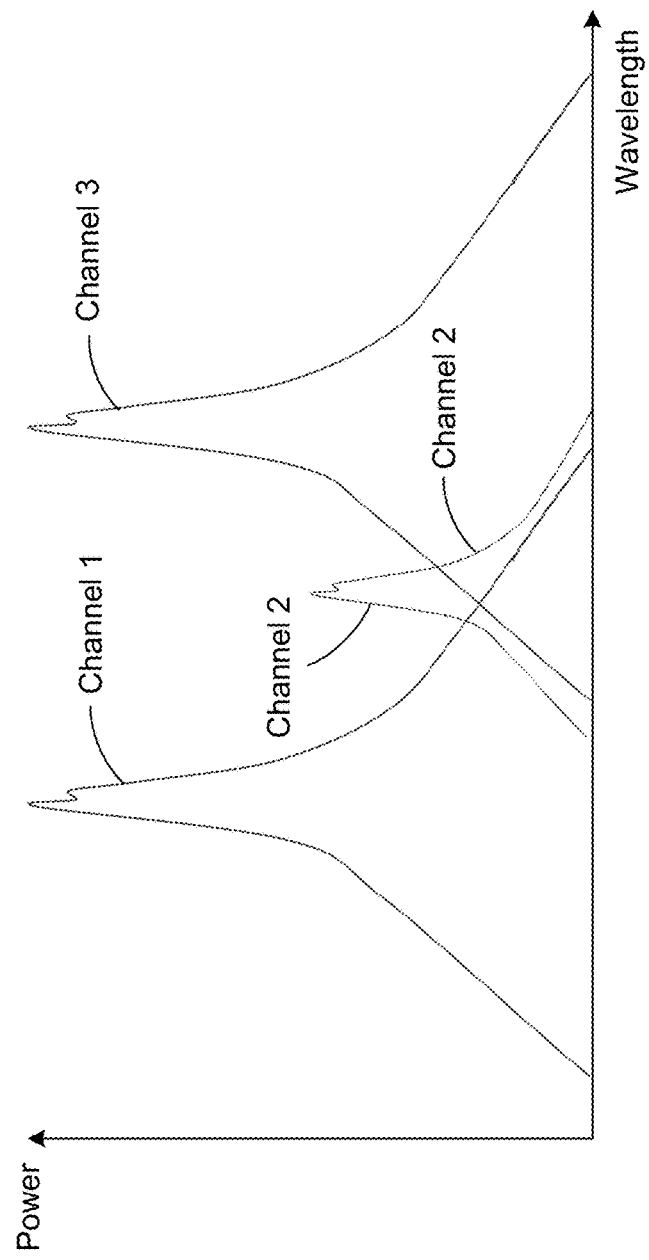
FIG. 1 is a graph of wavelength versus received power for three exemplary channels of a passive optical network (PON).
Figure 4:
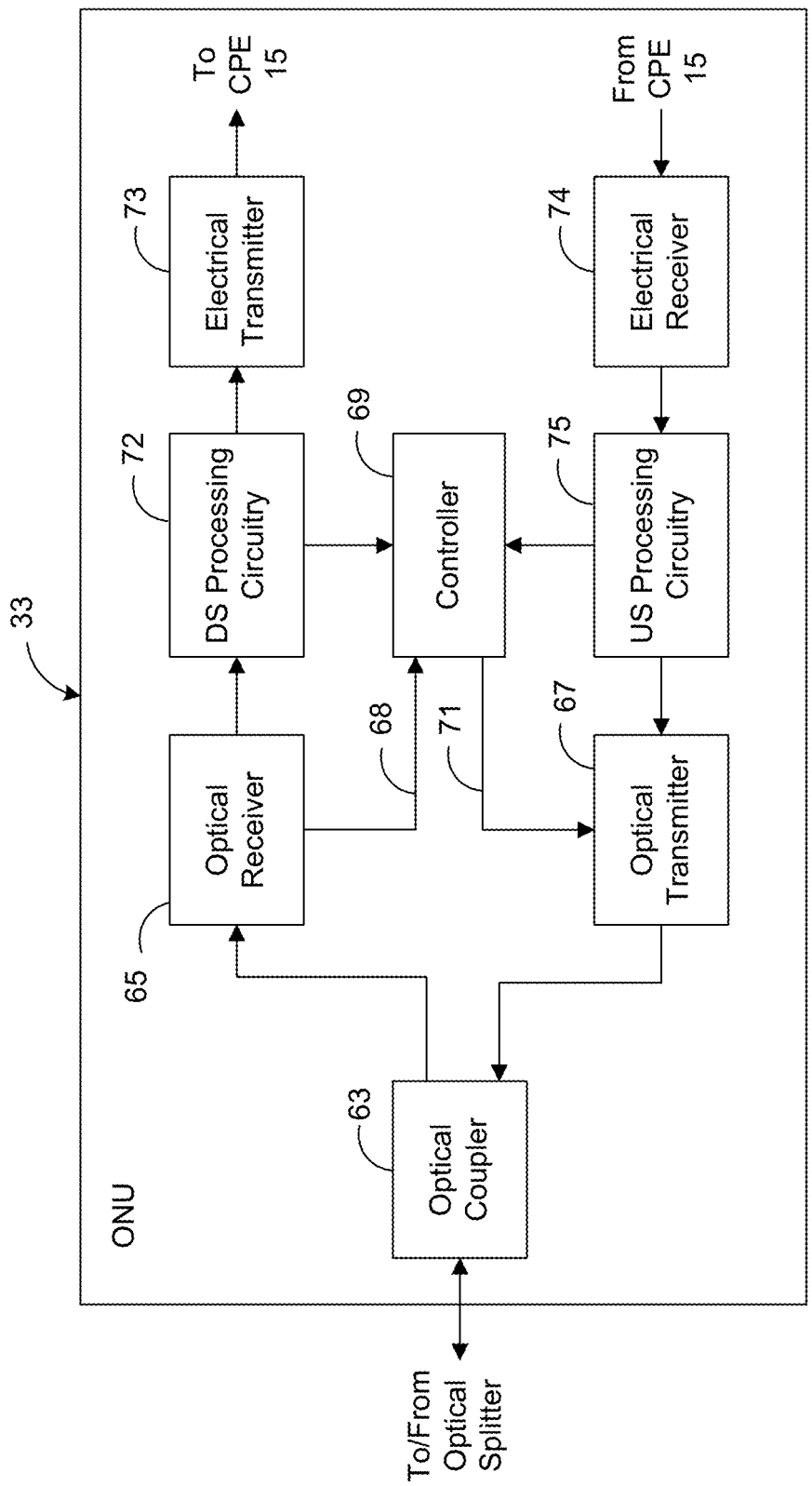
FIG. 4 is a block diagram illustrating an embodiment of an optical network unit (ONU) from the ODN of FIG. 2.

FIG. 4 is a block diagram illustrating an embodiment of an ONU 33. The ONU 33 can include an optical coupler 63 that can be used to couple the ONU 33 to an optical fiber. For example, referring to the embodiment shown in FIG. 2, the optical coupler 63 of the ONU 33 may be connected to fiber 31 and splitter 38 or fiber 35 and splitter 37. The optical coupler 63 can be connected to an optical receiver 65 to process downstream communications (e.g., an optical signal from the OLT 30 to the ONU 33) and an optical transmitter 67 to process upstream communications (e.g., an optical signal from the ONU 33 to the OLT 30). The optical receiver 65 can be used to convert a downstream optical signal from the optical domain to the electrical domain, and downstream (DS) processing circuitry 72 may process an electrical signal from the optical receiver 72. As an example, the DS processing circuitry 72 may convert messages from an optical protocol used for communication across the PON to an electrical protocol for communication by an electrical transmitter 73 to downstream equipment, such as CPE 15 (FIG. 1). Data messages may be transmitted downstream, and control messages may be transmitted to a controller 69 for processing. In addition, the optical receiver 65 can include circuitry for providing a signal 68 to the controller 69 that corresponds to the power level of the optical signal received from the OLT 30.

The optical transmitter 67 can be used to convert an upstream electrical signal from the CPE 15 or otherwise from the electrical domain to the optical domain and transmit the corresponding optical signal to the OLT 30 through the optical coupler 63. In this regard, an upstream electrical signal may be received by an electrical receiver 74 and upstream (US) processing circuitry 75 that converts messages from an electrical protocol to an optical protocol. The US processing circuitry 75 may transmit data messages to the optical transmitter 67 that converts the messages into an optical signal for transmission across the PON. The US processing circuitry 75 may also transmit control messages to the controller 69 for processing. In addition, the optical transmitter 67 can receive a signal 71 from the controller 69 that instructs the optical transmitter 67 to transmit an optical signal at a corresponding power level indicated by the signal 71.

Note that the controller 69 can be implemented in hardware or a combination of hardware, software, and/or firmware. In one embodiment, the controller 69 comprises a processor that is programmed with software to perform the controller's functionality, as described herein. However, other configurations of the controller 69 are possible. As an example, at least portions of the controller 69 may be implemented using a field-programmable gate array (FPGA) or one or more application-specific integrated circuits (ASICs).

Figure 5:
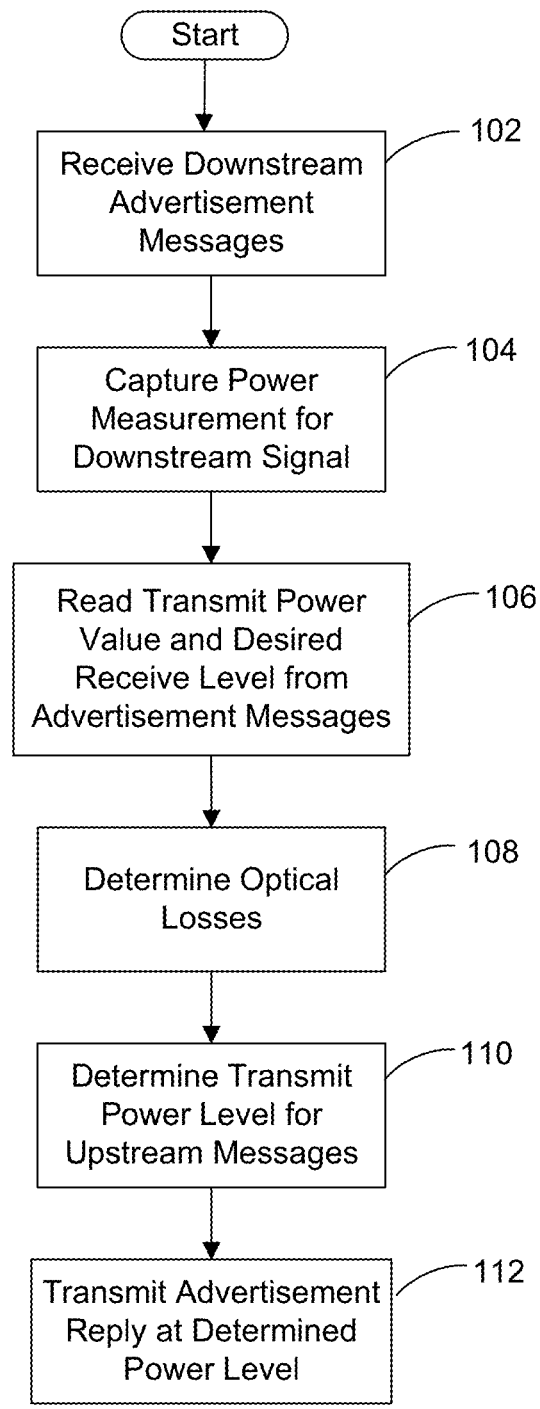
FIG. 5 is a flowchart illustrating an embodiment of a method for power leveling in an ONU.

As previously discussed, the ONU 33 may register with the OLT 30 during an activation process before the ONU 33 begins communicating with the OLT 30 in a subsequent data mode. FIG. 5 is a flowchart illustrating an embodiment of a method for power leveling in an ONU 33 that is attempting to register with the OLT 30.

The process begins with the ONU 33 receiving downstream advertisement messages, from the OLT 30 (step 102). The controller 69 captures (e.g., receives and stores) a measurement of received power for at least one of the downstream optical signal carrying the advertisement messages (step 104). In this regard, the power measurement circuit 70 may measure the power level of an advertisement message (or other message) from the OLT 30 and transmit a signal 68 defining a value indicative of such power measurement to the controller 69, which stores the value. The controller 69 parses each advertisement message and reads the transmit power value indicative of the OLT's transmit power level and the desired receive level value for the OLT 30 (step 106) from one or more of the advertisement messages.

The controller 69 uses the transmit power value from the OLT 30 and the measured power level of the downstream optical signal to determine the amount of optical losses in the path between the ONU 33 and the OLT 30 (step 108). In one embodiment, the controller 69 can subtract a value indicative of the measured power level from the transmit power value to determine the optical losses. After the controller 69 determines the optical losses, the controller 69 can then determine an appropriate power level to be used to transmit an upstream optical signal to the OLT 30 (step 110) based on the desired receive level advertised by the OLT and the estimated optical losses.

Once the controller 69 has determined the transmit power level for the upstream signal, it transmits to the optical transmitter 67 an advertisement reply and a signal 71 indicative of the determined power level. Based on the signal 71, the optical transmitter 67 converts the advertisement reply to an optical signal having the power level indicated by the signal 71 and transmits the advertisement reply through coupler 63 to the OLT 30. As indicated above, the advertisement reply may include the serial number for the ONU 33, but other types of replies are possible in other embodiments.

Note that there are various actions that the OLT 30 may take in response to the advertisement reply. In one embodiment in which the ONU 33 includes its serial number in the advertisement reply, the OLT 30 uses the serial number in order to assign a network address to the ONU 33 using techniques known in the art for assigning network addresses. The OLT 30 then replies to the advertisement reply by transmitting a PLOAM message that informs the ONU 33 of its network address. Thereafter the ONU 33 and OLT 30 may communicate using the ONU's network address. During the activation process and thereafter, the ONU 33 may continue to transmit messages to the OLT 30 at the same power level determined at step 110.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

The invention claimed is:

1. An optical network, comprising:
    an optical fiber;
    a wavelength division multiplexer coupled to the optical fiber;
    an optical line terminal (OLT) coupled to the optical fiber and configured to transmit a first optical signal through the optical fiber, wherein the OLT is further configured to include, in the first optical signal, control data indicative of a transmit power level of the first optical signal and a desired receive level for the OLT;
    a first optical network unit (ONU) coupled to the optical fiber and configured to communicate with the OLT through the optical fiber and the wavelength division multiplexer at a first wavelength, the first ONU configured to receive the first optical signal and to measure a received power level of the first optical signal, wherein the first ONU is further configured to calculate, based on the control data and the received power level, a value indicative of a transmit power level for a second optical signal to be transmitted by the first ONU and to transmit the second optical signal, based on the value, at said transmit power level and the first wavelength through the optical fiber to the OLT; and
    a second ONU configured to communicate with the OLT through the wavelength division multiplexer at a second wavelength,
    wherein the transmit power level is established such that interference from the second optical signal affecting an optical signal communicated to the OLT by the second ONU at the second wavelength remains below a threshold.

2. The optical network of claim 1, wherein the OLT is configured to include the control data in at least one physical layer operations and maintenance (PLOAM) message transmitted from the OLT to the first ONU.

3. The optical network of claim 2, wherein the OLT is configured to transmit the at least one PLOAM message in a downstream synchronization phase, and wherein the at least one PLOAM message is selected from the group including: a system profile PLOAM message, a channel profile PLOAM message, and a burst profile PLOAM message.

4. The optical network of claim 1, wherein the OLT is configured to transmit the control data to the first ONU via at least one advertisement message in an activation process in which the first ONU joins the optical network, wherein the first ONU is configured to transmit an advertisement reply via the second optical signal at the transmit power level to the OLT in the activation process in response to the at least one advertisement message, and wherein the OLT is configured to discover a presence of the first ONU on the optical network based on the advertisement reply.

5. The optical network of claim 4, wherein the OLT and the first ONU are configured to communicate in a ranging phase after the advertisement reply is transmitted from the first ONU to the OLT.

6. The optical network of claim 4, wherein the advertisement reply includes a first identifier identifying the first ONU, and wherein the OLT is configured to assign a network address to the first ONU for the optical network based on the first identifier.

7. The optical network of claim 1, wherein the first ONU is configured to calculate a path loss for the first optical signal based on the transmit power level indicated by the control data and the measured received power level of the first optical signal, and wherein the first ONU is further configured to calculate the value indicative of the transmit power level of the second optical signal based on the calculated path loss.

8. The optical network of claim 1, wherein the first ONU is configured to calculate the value using a deterministic, non-iterative power-leveling algorithm.

9. A method for use in an optical network, comprising:
    transmitting a first optical signal from an optical line terminal (OLT) of the optical network through an optical fiber to a first optical network unit (ONU), wherein the first optical signal includes control data having a first value indicative of a transmit power level for the first optical signal, and wherein the optical fiber is coupled to a wavelength division multiplexer;

measuring a received power level of the first optical signal at the first ONU;

determining, at the first ONU, a second value indicative of a transmit power level for a second optical signal to be transmitted by the first ONU based on the first value and the measuring;

transmitting the second optical signal at a first wavelength from the first ONU to the OLT based on the determining such that the second optical signal is transmitted by the first ONU at the transmit power level; and transmitting a third optical signal at a second wavelength from a second ONU to the OLT, wherein the second ONU is coupled to the wavelength division multiplexer, and wherein the determining is performed such that interference from the second optical signal affecting the third optical signal remains below a threshold.

10. The method of claim 9, wherein the control data has a third value indicative of a desired receive level for the OLT, and wherein the determining is based on the third value.

11. The method of claim 9, wherein the first optical signal includes the control data.

12. The method of claim 9, wherein the determining is performed using a deterministic, non-iterative power-leveling algorithm.

13. The method of claim 9, wherein the control data is transmitted by the OLT to the first ONU during an activation process between the OLT and the first ONU, wherein the transmitting the second optical signal comprises transmitting a message from the first ONU to the OLT at the transmit power level during the activation process, and wherein the method further comprises discovering at the OLT a presence of the first ONU on the optical network based on the message.

14. The method of claim 13, wherein the message includes an identifier identifying the first ONU, and wherein the method further comprises assigning a network address to the first ONU by the OLT in response to the message and based on the identifier.

15. The method of claim 14, further comprising communicating between the OLT and the first ONU during a ranging phase subsequent to transmission of the message from the first ONU to the OLT.

* * * * *